Figure 1:
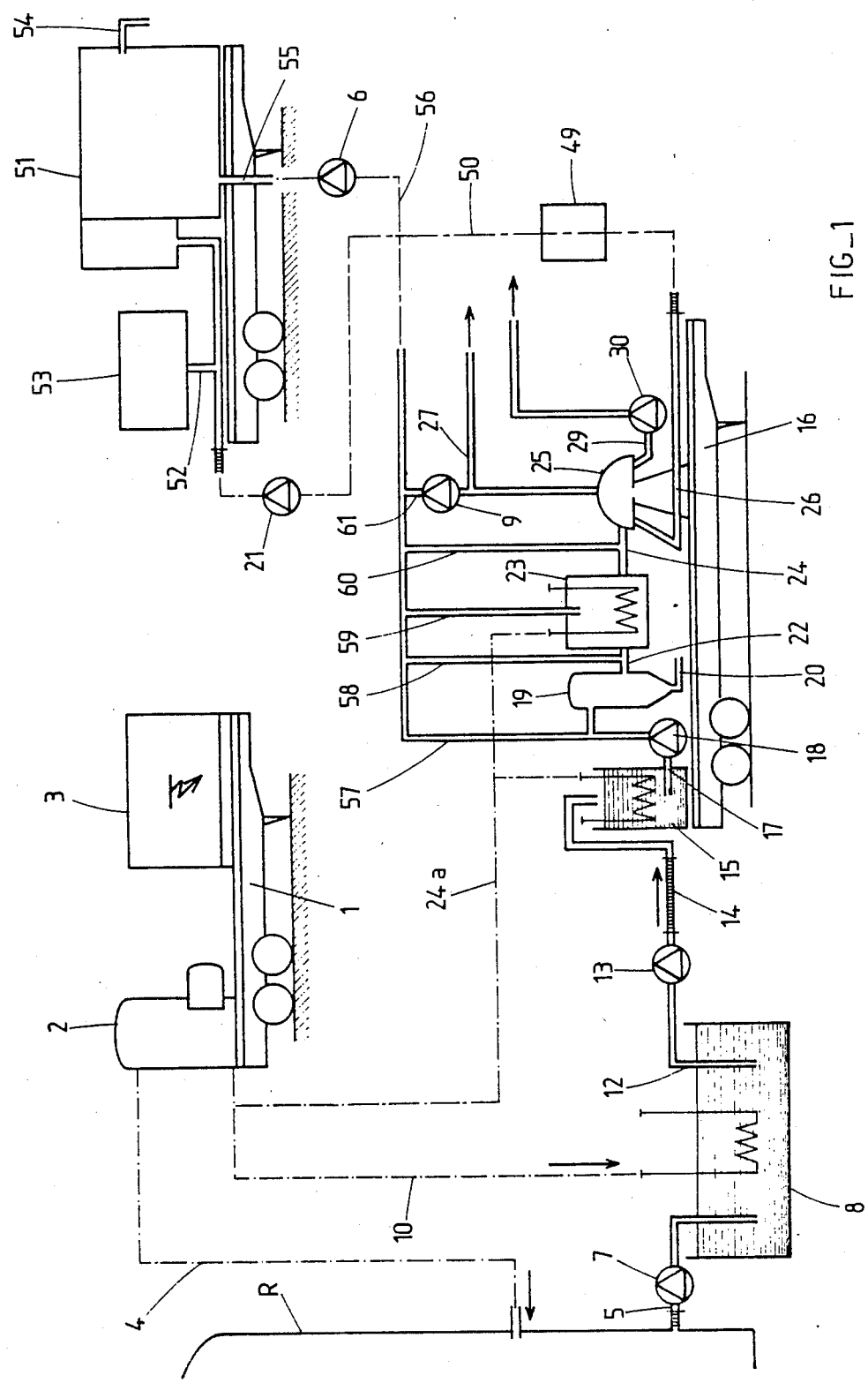

United States Patent [19]

Guinard

[11] Patent Number: 4,931,176

[45] Date of Patent: Jun. 5, 1990

[54] INSTALLATION FOR THE SEPARATION OF THE CONSTITUENTS OF A SUSPENSION

[75] Inventor: Paul Guinard, Saint Cloud, France

[73] Assignee: Guinard Oil Services, France

[21] Appl. No.: 272,446

[22] Filed: Nov. 17, 1988

Related U.S. Application Data

[62] Division of Ser. No. 38,728, Apr. 15, 1987, Pat. No. 4,810,393.

[30] Foreign Application Priority Data

Apr. 22, 1986 [FR] France .................................. 86 05780

[51] Int. Cl.⁵ .............................................. B01D 36/02
[52] U.S. Cl. .................................... 210/179; 210/182; 210/195.1; 210/196; 210/259; 210/297; 210/400

[58] Field of Search ............... 210/781, 783, 784, 787, 210/789, 799, 805, 806, 179, 181, 182, 184, 186, 195.1, 196, 202–204, 216, 259, 297, 298, 299, 314, 360.1, 400, 241

[56] References Cited

U.S. PATENT DOCUMENTS

| | | | |
|---|---|---|---|
| 3,954,611 | 5/1976 | Reedy | 210/195.1 X |
| 4,171,265 | 10/1979 | Battigelli et al. | 210/181 |
| 4,539,111 | 9/1985 | Takacs et al. | 210/179 |
| 4,751,006 | 6/1988 | Becker | 210/400 X |
| 4,849,116 | 7/1989 | Weinmann et al. | 210/182 X |

Primary Examiner—Tom Wyse
Attorney, Agent, or Firm—Arnold, White & Durkee

[57] ABSTRACT

Process and installation for the separation of the constituents of a suspension.

The installation comprises a self-cleaning filter (19), a heater (23), a centrifugal separator (25) and a belt filter (51) for filtering the solid sediments from separator (25).

10 Claims, 3 Drawing Sheets

FIG_1

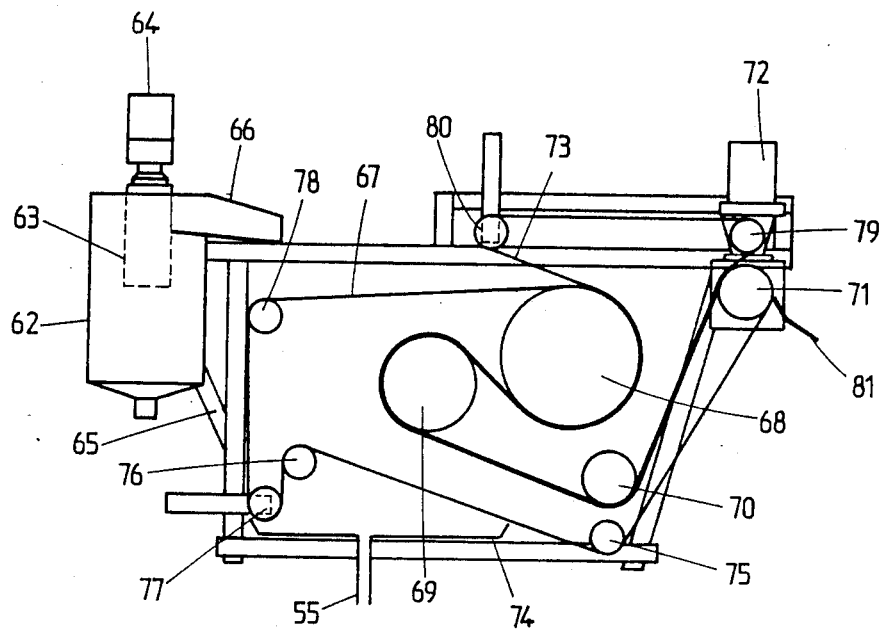
FIG_4

INSTALLATION FOR THE SEPARATION OF THE CONSTITUENTS OF A SUSPENSION

This is a division of application Ser. No. 07/038,728 filed April 15, 1987, now U.S. Pat. No. 4,810,393.

The present invention relates to process and installations for the separation of the constituents of a suspension. The invention more particularly applies to the recovery of the constituents of oil sludges, such as are in particular produced in the bottoms of hydrocarbon tanks, in sheets of water polluted by hydrocarbons and in other oil processing operations, particularly refining.

French patent specification 82 18 420 describes a process for the separation of the constituents of a suspension containing water, oil and solid substances, particularly oil sludge, which consists of heating the suspension to a temperature exceeding 60° C. and preferably between 60° and 90° C., optionally after passing it through a self-cleaning filter constituted by an envelope having an inlet for the suspension and an outlet for the sediments, a filtering surface defining with the inner wall of the envelope a chamber for the filtrate provided with an outlet for the latter and brush means for unclogging the filtering surface, separating the suspension by centrifuging at said temperature exceeding 60° C. into an essentially aqueous phase, into an essentially oily phase and into sediments essentially consisting of solid substances, water and traces of oil.

This process has been satisfactory and for the first time made it possible to treat oil sludges in a satisfactory manner. It is thus possible to treat or process petroleum waste, while obtaining sediments containing various solids, including hydrocarbons, water in large quantity and traces of liquid hydrocarbons. These sediments can be eliminated either by discharging, or by incineration, which are performed more economically as the water percentage in the sediments decreases. Thus, attemps have been unsuccessfully made to filter these sediments.

The present invention is directed at a separation process obviating the disadvantages referred to hereinbefore and which, on the basis of sediments containing up to 90% water, makes it possible to obtain a product which can be shovelled and which is sufficiently dry to reduce the elimination costs thereof.

The present invention therefore relates to a process for the separation of the constituents of a suspension containing water, oil and solid materials, particularly oil sludges, which consists of heating the suspension at a temperature exceeding 60° C. and preferably between 60° and 110° C., separating the same by centrifuging at this temperature into an essentially aqueous phase, into an essentially oily phase and into sediments mainly consisting of solid materials, water and traces of oil, characterized in that it comprises adding a flocculant to the sediments and, while the temperature thereof is at least 50° C. and preferably between 50° and 70° C. squeezing out the water therefrom by pressing on a filter having a mesh size smaller than 1 mm and preferably between 0.2 and 0.5 mm.

It has surprisingly been found that by introducing a flocculant into the sediments, preferably at a rate of 10 to 100 parts per million of dry matter and provided that the temperature of the sediments is at least 50° C., it becomes possible to filter the sediments on an appropriate filter and to squeeze the water therefrom by pressing. Whereas filters equipped with filter cloths, used in filter presses or belt filters which can be used in the process according to the invention, clog if the product to be filtered has an excessive liquid hydrocarbon percentage, this is not the case if the hydrocarbon content is previously significantly reduced by the process described in French patent specification 82 18 420 and if operation takes place at an adequate temperature. The heating of the sediments causes no particular problem, because they are already heated in the separation stage by centrifuging and it is sufficient to pass them downstream for filtration before they have had time to cool.

The first stage of the separation process according to the invention consists of passing the suspension containing water, oil and solid matter into a self-cleaning filter, which is not only able to remove a large part of the solid matter, no matter what the density thereof, but also to separate the solid matter less dense than the liquid constituents of the suspension, so that the filtrate from the filter can be safely directly supplied to the centrifugal separator. For this purpose, use is generally made of a self-cleaning filter, whose envelope is generally of vertically axed revolution with an outlet for the sediments provided in the bottom of the envelope, the very dense solid matter being located in the suspension is brought to the top of the envelope, gradually dropping into the latter and finally constituting a solid plug in front of the outlet for the sediments. The solid matter less dense than the liquid constituents of the suspension tend to clog the filtering surface, but unclogging takes place by unclogging means more particularly constituted by brushes which rotate with respect to the axis of the filtering surface, which is coaxial to the envelope. These solid products, which are less dense than the liquid constituents of the suspension consequently also pass into the plug which, every so often, is discharged through the outlet for the sediments. Only the very fine solid matter, notably having dimensions less than 400 microns, pass through the filter. However, all these fines are denser than the liquid constituents. Further details of this procedure are given in the aforementioned French patent specification, which is enclosed herewith by way of reference.

The second stage of the process according to the invention consists of heating the suspension to a temperature above 60° C. and preferably between 60° and 90° C. This stage is performed in an intermediate heater located between the self-cleaning filter and the centrifugal separator.

The third stage of the inventive process consists of separating the constituents of the suspension by centrifuging at a temperature above 60° C. and particularly between 60° and 90° C., into an essentially aqueous phase, an essentially oily phase and sediments essentially constituted by solid matter, water and traces of oil. The expression essentially aqueous phase is understood to mean a phase comprising at least 98% by volume of water and preferably at least 99% by volume of water and containing less than 1% by volume of oil and particularly less than 0.5% by volume of oil and also containing less than 1% by weight of solid matter and in particular less than 0.5% by weight of solid matter. The expression essentially solid matter is understood to mean that the solid matter denser than the liquid constituents of the suspension and contained in the original suspension occur in at least 90% by weight and preferably at least 95% by weight in the sediments. In general terms, the sediments contain 30 to 60% by weight of solid matter and 70 to 30% by volume of water. The term oil traces is understood to mean a volume quantity of oil less than 2% and preferably less than 0.5%. Separating by centrifuging takes place in a separator, which essentially comprises a rotary bowl and an inner conveyor rotating at a differential speed compared with the bowl.

The fourth stage of the inventive process consists of adding a flocculant to the sediments from the centrifugal separation process.

The flocculants which are generally used are anionic or cationic polyelectrolytes, particularly polyacrylamides. Thus, use can be made of Magnafloc products, which are high molecular weight, water-soluble, cationic, anionic or nonionic synthetic polymers. They have long chain molecules with an adequate affinity for solid surfaces. The molecule which is partly adsorbed on the particles brings about flocculation by the formation of a bridge linking the particles. It is also possible to use a cationic polyelectrolyte known under the name Zetag and particularly Zetags 87, 57 and 63. All these products are available from the firm Allied Colloids. It is standard practice to use 10 to 100 parts by weight of flocculants expressed as dry matter per million parts by weight of sediments. It is standard practice to add the flocculant in the form of a 2 to 5% by weight aqueous solution prepared at least thirty minutes prior to the use thereof.

The following stage of the process consists of passing the mixture of flocculants and sediments, at a temperature of at least 50° C., onto a filter having a mesh size smaller than 1 mm and in particular between 0.5 and 1 mm and to squeeze out the water from the sediments by pressing.

On flocculating the sediments between 80° and 90° C., flocculation takes place in a very adequate manner. Unfortunately the parts of the belt filter or filter press downstream undergo deformations at these temperatures. On awaiting the complete cooling of the sediments, flocculation is difficult and does not remain equal to itself in time and requires more flocculant. Thus, the most favourable temperature, bearing in mind the above difficulties is between 60° and 70°. It is very easy to obtain this temperature on the belt filter downstream of centrifuging by carrying out filtration over a period of 1 to 5 hours following the separation by centrifuging. Advantageously, these two operations can be carried out continuously with the possibility of an intermediate storage, which also facilitates the operation of adding a flocculant. If flocculants have been added to facilitate the centrifuging separating operation, these flocculants appear again in the sediments and can help to facilitate the subsequent filtration operation or to reducing the quantity of flocculant to be added.

The raising of the temperature necessary for the operation of separation by centrifuging is therefore utilized for the filtration by pressing. Conversely, the drying of the sediments downstream of the centrifugal separator means that in future operations there is no longer any need to fear the maintaining of an excess of water in the installation upstream and particularly in the centrifugal separator, because it is then possible to easily dispose of it.

According to an advantageous variant, the process according to the invention consists of returning the essentially aqueous phase and/or the water squeezed out of the sediments upstream of the self cleaning filter and/or in the stage of heating the suspension and/or between the filtering stage in the self-cleaning filter and the heating stage and/or between the heating stage and the centrifugal separation stage. An excellent result is obtained by returning the water just upstream of the self-cleaning filter, which makes it possible to fluidize the suspension at the instant of its passage into the filter. However, it is also advantageous to provide ducts with sets of valves making it possible to inject water at other points of the installation and particularly into the preheating tank, when the recycled water does not mix easily with the product to be treated. The benefit is then obtained of the mixing being carried out in said preheating tank. It is also possible to supply water just downstream of the self-cleaning filter, which makes it possible by a set of valves to bring about the countercurrent rinsing of said filter without having to dismantle it. Moreover, the recycling of the water also makes it possible to recycle the corresponding calories, which reduces the calorific losses and makes it possible to improve the stability of treatment of the suspension. Finally, said recycling has a supplementary advantage. At the time of starting and stopping the installation, it is possible to start and finish treatment by passing pure water into the separator and by introducing the suspension to be separated into the separator in a progressively increasing or decreasing manner, from zero to a maximum or from maximum to zero, without the suspension having the possibility of clogging or blocking the centrifuging bowl, because its flow rate is not adequate or because it encounters cold zones having a tendency to set or fix it. It is thus readily apparent that the recycling of the water at various points of the installation can vary to a considerable extent and it is thus that it is possible to return 10 to 80% of the water squeezed out of the sediments to the installation. The quantity of water entering the separator can represent 90 to 10% by volume of the entire water and suspension.

The invention is also directed at an installation for performing the process, which comprises a centrifugal separator and, optionally, upstream of the centrifugal separator, a self-cleaning filter constituted by an envelope having an inlet for the suspension and an outlet for the sediments, a filtering surface defining with the inner wall of the envelope a chamber for the filtrate equipped with an outlet for the same and means for unclogging the filtering surface, a heater inserted between the self-cleaning filter and the centrifugal separator, wherein a pipe is provided for connecting the outlet for the sediments from the centrifugal separator with a filter having a mesh size between 0.4 and 0.5 mm and functioning with the application of a pressure to the product to be filtered.

The invention is described hereinafter relative to the drawings, wherein show:

FIG. 1 A diagram of an installation according to the invention.

Figure 2:
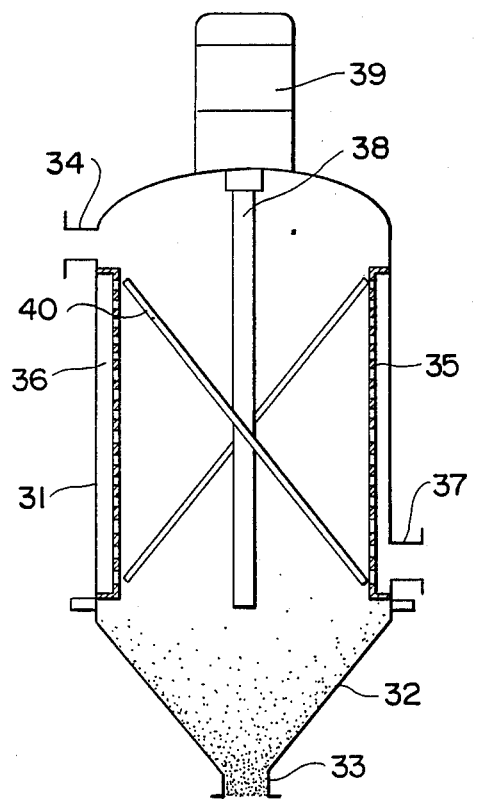

FIG. 2 A diagram of the self-cleaning filter according to the invention.

Figure 3:
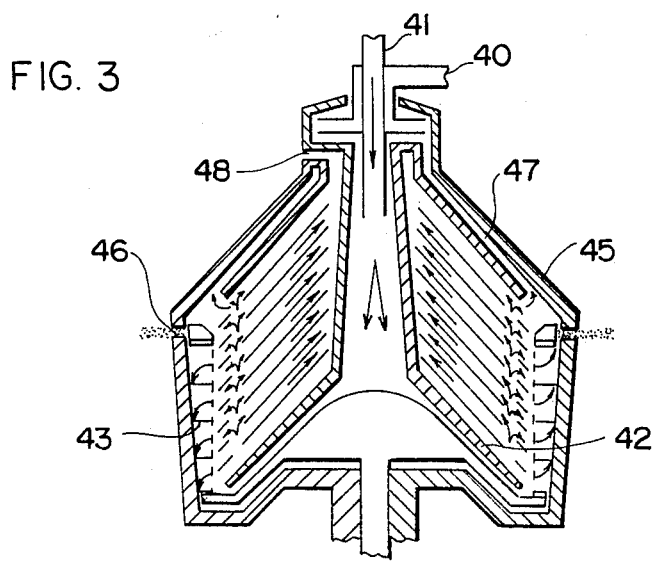

FIG. 3 A diagram of the centrifugal separator of the installation according to the invention.

FIG. 4 A diagram of the belt filter of the installation according to the invention.

The installation shown in FIG. 1 is connected to a storage tank or reservoir R for oil products. The installation comprises a first vehicle 1 carrying a hot water or steam boiler 2 with a power pack 3. As a variant, it is possible to receive steam and electric power from fixed installations. This boiler 2 can be connected by a pipe 4 to an inlet of tank R issuing at the bottom thereof into the sludge. From the bottom of tank R emanates a pipe 5, with pump 7, which issues into a container 8. The latter can be heated by a steam circuit 10 from boiler 2. From container 8 issues a pipe 12 with pump 13 which, by a flexible pipe 14, issues into a heating tank 15 heated by the steam from boiler 2 and carried by a vehicle 16. The latter also carries the remainder of the installation. From the bottom of the heating tank 15 emanates a pipe 17 with pump 18, which is linked with the inlet for the suspension of a self-cleaning filter 19. The sediments from the self-cleaning filter 19 are discharged by a pipe 20. The outlet for the filtrate from self-cleaning filter 19 is connected to a pipe 22, which supplies an intermediate heater 23 heated by a steam circuit 24a from boiler 2. Heater 23 is connected by a pipe 24 with a centrifugal separator 25 having an outlet for the sediments which is connected to a pipe 26, an outlet for the densest liquid constituent connected to a pipe 27 and an outlet for the less dense liquid constituent connected to a pipe 29 equipped with a pump 30. Pipe 26 issues into an intermediate tank 49, whereof the outlet pipe 50 communicates via a pump 21 with the inlet of a belt filter 51 carried by a vehicle. A pipe 52 from a tank 53 for a flocculant solution issues into pipe 50. In general, the speed of the belts is between 2 and 8 m/min.

The solid product from belt filter 51 is discharged by a drain 54, while the water separated by said belt filter 51 can be discharged by a pipe 55 or can be recycled through a pump 61 by a pipe 56 upstream of the self-cleaning filter 19 via a pipe 57, downstream of self-cleaning filter 19, i.e. between the latter and heater 23 via a pipe 58, in heater 23 via a pipe 59 or between heater 23 and centrifugal separator 25 by pipe 60. There is a not shown the valve system making it possible to pass said recycled water, as desired, into one or more of the pipes 57, 59, 58, 60.

In the same way, it is possible to sample by a pipe 61 through a pump 9 all or part of the aqueous phase located in pipe 27 and to bring said aqueous phase into pipe 56, from which it can be recycled by pipes 57, 58, 59 and 60.

FIG. 2 is a more detailed diagram of self-cleaning filter 19. The latter essentially comprises an envelope 31 substantially of revolution about a vertical axis and whereof the bottom is shaped like a hopper 32 with an outlet 33 for the sediments. At the top, the envelope is provided with an inlet 34 for the suspension to be filtered. An annular filtering surface 35 is fixed along the inner cylindrical wall of envelope 31, while defining therewith an annular chamber 36 which is closed for the filtrate. Chamber 36 is provided with an outlet 37 traversing envelope 31. Shaft 38 of a geared motor 39 extends along the vertical axis of the filter and carries a number of brushes 40 inclined with respect to the horizontal. These brushes are rotated and rub against the filtering surface 35 so as to unclog the same.

The self-cleaning filter functions in the following way. The suspension enters through inlet 34. The densest solid constituents drop of their own accord in a gradual manner and by gravity to the bottom and collect in hopper 32 in front of outlet 33, because they are unable to pass through the filtering surface 35. The less dense solid constituents are moved towards the filtering surface and tend to remain there and to cause clogging unless they are moved towards the bottom by brushes 40, in such a way that they agglomerate with the plug of solid matter gradually forming in front of outlet 33. The liquid constituents to which are added the very fine solid constituents and having a grain size e.g. below 400 microns pass through the filtering surface 34 and enter chamber 36 for the filtrate and leave through outlet 37. Every so often outlet 33 is opened, so as to pass out the solid matter agglomerate accumulating in hopper 32. This filter is consequently able to operate continuously, because it is self-cleaning and has the remarkable feature of also eliminating, despite its continuous operation, the solid constituents of the suspension which are less dense than the liquid constituents thereof.

FIG. 3 is a diagram of centrifugal separator 25, which functions continuously. It comprises a central inlet 41 for the suspension in a bowl 42 rotating at a speed different from an internal conveyor 43 located on the periphery of the bowl in the vicinity of envelope 45 of the centrifugal separator. Under the effect of the centrifugal force, the denser solid particles are immediately engaged against the inner wall of the bowl, scraped upwards by conveyor 43 and leave through ejection orifices 46, while the two liquid constituents to be separated are separated in the stack of inclined plates within the bowl as a function of their density, an outlet 47 being provided for the denser liquid phase, which is discharged towards the periphery and which forces towards the interior the less dense liquid constituent for which an outlet 48 is provided. FIG. 4 is a more detailed diagram of belt filter 51. Pipe 56 issues into the bottom of a tank 62 in which rotates a frame 63 driven by a motor 64, the frame serving as an agitator. Tank 62 is carried by the belt filter frame 65. At the top of the tank 62 is provided a distributor 66 able to spread the sediments on an endless first filtering belt 67, passing over successive horizontally axed rollers 68, 69, 70 and 71, the latter roller being rotated by a motor 72. A second filtering belt 73, identical to the first and made from Nylon fabric with a mesh size of approximately 4/10 mm, while passing over belt 77, winds onto roller 68, roller 69, roller 70 and roller 71. Thus, the sediments are pressed between the two belts 67 and 73 under a relative pressure between 0.1 and 0.3 bar. The squeezed out water drops into a tank 74 fixed to the bottom of the machine and flows outside through pipe 55 issuing from the bottom of tank 74. On leaving the driving roller 71, the two belts separate. Belt 67 returns via the horizontally axed rollers 75, 76, 77 and 78, while the upper belt 73 returns by rollers 79 and 80. A scraper 61 separates the dehydrated product from the lower belt 67. The dehydrated cake leaves through drain 54.

The installation functions in the following way. Hot water is supplied by pipe 4 to the bottom of the oil product storage tanks. This hot water suspends the sludges, so as to make the mixture sufficiently non-viscous to be pumped by pump 7 into container 8. In the latter, the suspension of sludges and hot water is heated by steam from boiler 2 and supplied by pipe 10, so as to aid the subsequent separation. The suspension, which contains water, hydrocarbons and solid sediments, which are both more and less dense than the liquid constituents, is passed by pump 13 and pipe 14 to the buffer tank 15. From the latter, the suspension is supplied by pump 18 and pipe 17 into the self-cleaning filter 19. The coarse solid products and in particular the products which are less dense than the liquid constituents of the suspension are discharged to the outside by pipe 20. While the liquid constituents and very fine solid products pass into the intermediate heater 23, which heats them in order to favour the action of centrifugal separator 25 to which the suspension is supplied by pipe 24, which is connected to the supply 41 for the separator.

The solid constituents are separated in the separator and leave via openings 46, which are linked with pipe 26. Water, which has a higher density than oil products leaves through outlet 40, which is connected to pipe 27 and, if necessary, can be returned to the steam and hot water boiler 2. Outlet 48 is connected to pipe 29 by which the worthwhile oil products are recovered.

The aqueous phase from pipe 27 can be wholly or partly diverted by pump 9 and pipe 61 and can be supplied to pipes 57, 58, 59 and 60 as recycled water. This also applies with respect to the water leaving belt filter 51 via pipe 56.

The following examples serve to illustrate the invention.

EXAMPLE 1

In an installation like that shown in the drawings, approximately 800 m$^3$ of floatation sludge collected in a storage tank is treated. Initially the product has the following average composition:

| | |
|---|---|
| Hydrocarbons | 16.5% by volume |
| Water | 78% by volume |
| Sediments | 5.5% by volume | i.e. roughly three times less by weight of sediments.

The rotation speed of separator DC6 is 4200 rpm, which gives a centrifugal acceleration of approximately 5000 g in the zone of the sediments. 20% of the aqueous phase from pipe 27 is recycled upstream of self-cleaning filter 19. This aqueous phase comprises 0.05% by volume of hydrocarbons, 99.90% by volume of water and 0.05% by volume of sediments. An oily phase containing 99.89% by volume of hydrocarbons, 0% water and 0.11% by volume of sediments is obtained through pipe 29. The sediments obtained at the outlet of centrifugal separator 25 by pipe 26 contain 4.9% by volume of hydrocarbons, 92% by volume of water and 3.1% by weight of sediments. This is a product which cannot be shovelled and which does not burn of its own accord. These sediments are passed into the belt filter 51, following the addition of 50 parts per million of Magnafloc, which is a flocculant. The intermediate storage time in tank 49 is less than one hour. Separation takes place in centrifugal separator 25 at a temperature of approximately 70° C. and filtration on belt filter 51 takes place at approximately 60° C. The linear speed of the belts in the belt filter is 6 meters/minute.

A sediment phase with a hydrocarbon content of 12% by volume, a water content of 71% by volume and a solid product content of 17% by weight is collected in the discharge drain 54 of belt filter 51 by weight. This is product can be shovelled.

The solid product leaving drain 54 is subjected to a leaching test (100 g of crude waste are contacted for 15 hours with 1 liter of $CO_2$-saturated demineralized water and then air at a temperature of 20° C., the turbid supernatant being centrifuged and the total hydrocarbons analyzed on the centrifugate). There are 300 mg of hydrocarbons per liter. The lower calorific power of the same product is 7704 J/g.

EXAMPLE 2

The floatation sludge previously partly dehydrated are treated by thickening in the same way as in example 1, except that the linear speed of the belts of the belt filter is 10 meters/minute, to take account of the large proportion of sediments in the product. The floatation sludge initially contains 10% by volume of hydrocarbons, 48% by volume of water and 42% by volume of sediments (approximately three times less by weight).

The temperature on entering the centrifugal separator 25 is approximately 90° C. Through pipe 27 is obtained an aqueous phase with a composition such that it can be directly discharged into the drains of a refinery. An oily phase which can be recycled within a refinery is obtained through pipe 29. Pipe 27 gives sediments with a hydrocarbon content of 3% by volume, a water content of 75% by volume and a solid matter content of 22% by weight. This product cannot be shovelled.

This product is supplied to belt filter 51, following the addition of 60 parts per million of Zetag as the flocculant. The temperature of passing to the belt filter 51 is approximately 70° C. and this leads to a volume reduction (by eliminating the water) in a proportion between 3:1 and 5:1, which permits considerable economies regarding the incineration costs of said phase.

EXAMPLE 3

Example 1 is repeated with sludges having variable compositions; the hydrocarbon content varying from 3 to 6% by volume, the water content from 88 to 94% by volume and the sediment content from 5 to 6% by volume. Over a period of several weeks, it is observed that the installation equipped with belt filter 51 reduces the volume of the sediment phase in a proportion of approximately 5:1, so that the volume of sediment to be incinerated becomes approximately one tenth of the initial volume of the product to be treated.

Every so often during the campaign, the product to be treated may be abnormally rich in oil or sediments. Its composition is then corrected by recycling part of the water separated at the outlet of belt filter 51. This gives an average flow rate of 60 m$^3$/day of product for several weeks, instead of less than 30 m$^3$ when there is no water recycling.

At the start and end of the day, during the starting and stopping of treatment, an increasing or decreasing quantity of water is progressively passed through pipe 60, whereas during the actual campaign it is preferable to recycle the water through pipe 57 and, every so often, to unclog the filter 19 by feeding in water through pipe 58.

The invention is obviously not limited to the embodiments described. In particular the relative pressures indicated in the belt filter are sufficient for obtaining the desired result, but can be advantageously increased, e.g. up to 3 bar and in particular up to 1 bar.

I claim:

1. Apparatus for the separation of the constituents of a suspension containing water, oil and solid materials, particularly oil sludges, which comprises:
   a self-cleaning filter, constituted by an envelope having an inlet for the suspension and an outlet for sediments, a filtering surface defining with the inner wall of the envelope a chamber for the filtrate equipped with an outlet for the same, and means for unclogging the filtering surface;
   a heater;
   a centrifugal separator for separating the suspension into an essentially aqueous phase, an essentially oily phase and into sediments mainly comprising solid materials, water and traces of oil, said heater being located between the self-cleaning filter and said centrifugal separator; and a filter connected to an outlet for the sediments from the centrifugal separator, said filter having a mesh size between 0.4 and 0.5 mm and functioning with the application of pressure to the product to be filtered.

2. The apparatus according to claim 1, wherein the filter connected to the outlet for the sediments from the centrifugal separator is selected from the group consisting of a filter press and a belt filter.

3. The apparatus according to claim 1, comprising means for connecting the outlet for discharging the essentially aqueous phase from the centrifugal separator to a point prior to the self-cleaning filter.

4. The apparatus according to claim 1, comprising means for connecting the outlet for discharging water from the filter connected to the outlet for the sediments from the centrifugal separator, to a point prior to the self-cleaning filter.

5. The apparatus according to claim 1, comprising means for connecting the outlet for discharging the essentially aqueous phase from the centrifugal separator to a point after the self-cleaning filter.

6. The apparatus according to claim 1, comprising means for connecting the outlet for discharging water from the filter connected to the outlet for the sediments from the centrifugal separator, to a point after the self-cleaning filter.

7. The apparatus according to claim 1, comprising means for connecting the outlet for discharging the essentially aqueous phase from the centrifugal separator to the heater.

8. The apparatus according to claim 1, comprising means for connecting the outlet for discharging water from the filter connected to the outlet for the sediments from the centrifugal separator, to the heater.

9. The apparatus according to claim 1, comprising means for connecting the outlet for discharging the essentially aqueous phase from the centrifugal separator to a point between the heater and the centrifugal separator.

10. The apparatus according to claim 1, comprising means for connecting the outlet for discharging water from the filter connected to the outlet for the sediments from the centrifugal separator, to a point between the heater and the centrifugal separator.

* * * * *